Reissued Jan. 13, 1953 Re. 23,614

UNITED STATES PATENT OFFICE 23,614

METHOD OF TREATING WATERS, INCLUDING BOILER WATERS, AND COMPOSITION THEREFOR

Wayne L. Denman, Oak Park, Ill., assignor to Dearborn Chemical Company, Chicago, Ill., a corporation of Illinois No Drawing. Original No. 2,400,543, dated May 21, 1946, Serial No. 321,140, February 27, 1940. Application for reissue March 1, 1952, Serial No. 274,520

29 Claims. (Cl. 210—23)

Matter enclosed in heavy brackets [ ] appears in the original patent but forms no part of this reissue specification; matter printed in italics indicates the additions made by reissue.

The present invention relates to the treatment of waters, or aqueous baths, having present ingredients inducing foaming. More particularly, waters of the above character are treated with amines or more especially aliphatic amines, which are sparingly soluble, or substantially insoluble in the water being treated, preferably do not steam distill to any substantial extent, and exhibit little tendency to saponify with the ingredients of the water or aqueous bath.

The invention, in its narrower form, contemplates the treatment of waters with saturated and/or unsaturated aliphatic amines, said compounds containing eleven (11) or more carbon atoms, being substantially insoluble in water, and showing little tendency to steam distill. In the more specific form of the invention, said compounds are used to inhibit the foaming tendency of raw or softened alkaline waters and particularly boiler waters having excess alkalinity, or an alkalinity present in a quantity more than sufficient to combine with the calcium and/or magnesium ions, salts or their equivalents contained in the water.

It may be stated that the solubility of the aliphatic amines in water decreases with the molecular weight thereof, and, therefore, in accordance with the present invention, it is preferred to use those amine compounds which have a high molecular weight, and by this is meant compounds having eleven (11) carbon atoms or more, and typified by undecyl amine, dodecyl amine, tridecyl amine, and the like, these all being straight chain primary amines.

As previously pointed out, aliphatic amines which are sparingly soluble, or substantially insoluble, may be used as the primary anti-foam agent in a composition adapted to inhibit the foaming in waters containing ingredients inducing foaming therein. These amines are particularly capable of giving satisfactory results in inhibiting the foaming tendency of waters containing excess alkalinity, and particularly excess sodium and potassium alkalinity. These amines as a group show substantially no tendency to saponify in the water or aqueous bath treated. Preferably, where the water treated is subjected to a high temperature, the aliphatic amines should not steam distill to any material extent. Examples of aliphatic amines which may be used in accordance with the present invention are hexadecyl amine ($C_{16}H_{33}NH_2$), heptadecyl amine ($C_{17}H_{35}NH_2$), octadecyl amine ($C_{18}H_{37}NH_2$), and secondary octyl amine ($C_8H_{17}NHC_8H_{17}$).

It may be pointed out that in accordance with the present invention, it is the intention to use the broad class of amines, either aliphatic or aromatic, which are sparingly soluble, or substantially insoluble in water, and which prevent the foaming of the water or the aqueous bath treated. Generally, it is the amines of high molecular weight which are the most satisfactory, and as a general rule, it may be stated that the most insoluble ones are the amines which contain more than ten (10) carbon atoms, particularly the straight chain primary amines. However, it may be pointed out that the split chain primary amines, as well as the straight chain and split chain secondary and tertiary amines, may be used in accordance with the present invention.

Other straight chain primary amines which may be used as an anti-foam agent are:

Undecyl amine ($C_{11}H_{23}NH_2$)
Dodecyl amine ($C_{12}H_{25}NH_2$)
Tridecyl amine ($C_{13}H_{27}NH_2$)
Tetradecyl amine ($C_{14}H_{29}NH_2$)
Pentadecyl amine ($C_{15}H_{31}NH_2$)
Nonadecyl amine ($C_{19}H_{39}NH_2$)
Eicosyl amine ($C_{20}H_{41}NH_2$)
Heneicosyl amine ($C_{21}H_{43}NH_2$)
Docosyl amine ($C_{22}H_{45}NH_2$)
Tricosyl amine ($C_{23}H_{47}NH_2$)
Tetracosyl amine ($C_{24}H_{49}NH_2$)
Pentacosyl amine ($C_{25}H_{51}NH_2$)
Hexacosyl amine ($C_{26}H_{53}NH_2$)
Heptacosyl amine ($C_{27}H_{55}NH_2$)
Octacosyl amine ($C_{28}H_{57}NH_2$)
Nonacosyl amine ($C_{29}H_{59}NH_2$)

and the like.

Several of the above amines are known under other names, as for example lauryl amine ($C_{12}H_{25}NH_2$), myristyl amine ($C_{14}H_{29}NH_2$), mellisyl amine ($C_{30}H_{61}NH_2$), and cerotyl amine ($C_{26}H_{53}NH_2$).

It is within the province of the present invention to use the isomeric forms of the straight chain amines or any other amines which are sparingly soluble or substantially insoluble in water and which inhibit the foaming of the water or aqueous bath being treated. For example, the amine group may be attached to the first, or the second, or the third, or any other subsequent carbon atoms in the chain.

Examples of such isomeric forms are as follows:

Considering the normal straight chain primary amine, as set forth in the immediately preceding table, said amine being as for example undecyl amine having the formula ($CH_3(CH_2)_{10}NH_2$), the isomeric amine thereof is methyl, nonyl, methyl amine ($CH_3(CH_2)_8CHNH_2CH_3$).

Other isomers of this same normal amine are:

Ethyloctylmethylamine, $$CH_3(CH_2)_7CHNH_2CH_2CH_3$$

Propylheptylmethylamine, $$CH_3(CH_2)_6CHNH_2(CH_2)_2CH_3$$

Butylhexylmethylamine, $$CH_3(CH_2)_5CHNH_2(CH_2)_3CH_3$$

Diamyl methyl amine, $$CH_3(CH_2)_4CHNH_2(CH_2)_4CH_3$$

Similar isomeric amines may be prepared from other normal straight chain amines.

Secondary amines which are suitable for carrying out the present invention are:

Secondary heptylamine, $C_7H_{15}HNC_7H_{15}$
Secondary octyl amine, $C_8H_{17}NHC_8H_{17}$ Tertiary amines suitable for carrying out the present invention are:

Tertiary octylamine, $(C_8H_{17})_3N$
Tertiary heptylamine, $(C_7H_{15})_3N$

Secondary and tertiary amines typified by the above mentioned amines have a number of isomeric forms which may be used in carrying out the present invention. Unbalanced straight chains or split chains result in many isomers for each amine having all alkyl groups the same.

Irrespective of to which carbon atom the amine group is attached, the material is a straight chain primary amine. Not only is it possible to use straight chain and split chain secondary and tertiary amines, but the isomeric forms of such amines may be used, and these compounds may differ from each other only in having an alkyl group substituted for one or both of the hydrogens in the amine group. If one hydrogen is substituted for, it would of course, be a secondary amine, and if both of the hydrogens are substituted for, it would be a tertiary amine. Substituting alkyl groups for hydrogens in the amine group, would tend to result in products of lower water solubility. However, the point is here made that the amine, irrespective of the substitution that has been made, should be one that has negligible water solubility. Further, the amines herein disclosed should preferably have a specific gravity less than water, so as to eliminate any tendency of the anti-foam agents to settle to the bottom of the treatment vessel.

Very satisfactory results have been obtained when the present invention has been applied to waters containing sodium or potassium alkalinity, that is, water in which the sodium or potassium alkalies, or their equivalents, and particularly sodium or potassium hydroxides, carbonates or bicarbonates, exist in excess of that capable of combining with or existing in combination with calcium and/or magnesium ions present in the water.

Alkalinity of this type can exist naturally in the water or may be derived from zeolite treatment of the water, or may be derived in other ways.

The present invention may be applied to raw waters either hard or soft and beneficial results obtained. Water, which has been softened by the lime-soda-ash process or by phosphates, sodium silicates, or other alkaline treatment, may be treated with an anti-foam composition of the character herein set forth.

It is well known that many substances have decided anti-foam properties when used in conjunction with normal types of water which are free from excess alkalinity, such as sodium alkalinity, or which have a low percentage of sodium alkalinity. Castor oil and sperm oil typify such substances.

When materials of ths type are added to waters of excess alkalinity, and especially excess sodium and/or potassium alkalinity, poor or mediocre results are obtained in reducing the foaming tendency of the water. It seems probable that the foaming occurring in boiler water is the result of the concentration of soluble salts and insoluble solids in a state of suspension. In waters of excess alkalinity there may be present sodium and/or potassium bi-carbonates and/or carbonates, and there may be present sodium and/or potassium carbonates and/or hydroxides. Under conditions prevailing in an operating boiler, a large percentage of the bi-carbonates and carbonates originally present in the water are converted into hydroxides. It may well be that because of the presence of these hydroxides that the usual anti-foam materials are ineffective when added to boiler waters having high or moderately high concentrations of alkali hydroxides or other alkali materials.

When oils of the above type are added to boiler water, there is a tendency for them to be saponified or react chemically with the alkali hydroxides or other alkali compounds, with the resultant formation of soluble sodium and/or potassium soaps. The foaming tendencies of sodium and potassium soaps are well recognized and the formation of such soaps accelerate the tendencies of the boiler water to foam.

The following is a specific example, illustrating such acceleration and foaming tendency. An experimental boiler operating at a pressure of 200 lbs. per square inch, with an excess caustic alkalinity in the neighborhood of 200 grains per gallon, was treated with a standard anti-foam material containing 16% of castor oil by weight, the proportion being one-quarter pound of the castor oil material per 1000 gallons of water. Immediately after the introduction of the anti-foam material, a test showed no foaming occurring. One hour after the introduction of the anti-foam material, the amount of foaming occurring was approximately 25% greater than that taking place before the anti-foam material was added. The increase in foaming occurring one hour after the introduction of the anti-foam material, namely, castor oil, is due to the saponification of the same by the alkalies present in the boiler water.

Steam distillation of the usual anti-foam materials may, in some measure, reduce the effectiveness of these anti-foam materials in boiler water of high or excess sodium or equivalent alkalinity. However, since most of the usual anti-foam materials can be used effectively in water containing little or no sodium alkalinity, and their effectiveness maintained, to a large degree at least, for several hours, steam distillation of the anti-foam material is probably of minor importance.

In one form of the present invention, water containing alkalinity, and particularly sodium or potassium alkalinity, is treated with a material that is unsaponifiable and does not steam distill to any marked degree. Waters softened by base exchange processes, and especially those which have been treated with zeolites or waters having a high natural sodium carbonate or sodium bicarbonate alkalinity are typical of waters having foaming properties and which may be treated in accordance with the present invention, which resides not only in said method, but also in the utilization of a particular class of anti-foam materials, and the method of preparing the same. While the average operating boiler pressure is around 200 pounds per square inch, it is to be understood that the present invention is applicable to boiler pressures materially higher or lower than 200 pounds per square inch.

The amines of the present invention may be mixed with a dispersing agent, and in the narrower form of the invention, the preferred dispersing agent is tannin, as will be hereinafter more fully pointed out.

It may be stated that three principal typical classes of dispersing agents are available. The first class comprises inorganic colloidal material, such as clays or bentonite; the second class, organic material which contain appreciable quantities of soap in one form or another; and the third class, organic materials which are characterized by colloidal properties and which contain no soap of any kind. This third class of materials includes the extracts of various woods and barks which would normally be referred to as tannin extracts; extracts of various aquatic plants, such as seaweeds or kelp; and extracts of certain plants and shrubs, such as cactus plants.

Clays or bentonite may, of course, be used, but the disadvantages of this type of material makes it inadvisable to use it as the sole dispersion agent, since it does not lend itself to the very great dispersion that is necessary when a very small quantity of an anti-foaming compound is dissolved in a relatively large amount of boiler feed water. However, the clays or bentonite may be used as the dispersion agent when mixed with other materials, as hereinafter set forth.

The soap dispersion agents may under some circumstances be used, but certainly not where there is an excess of alkali present, because the soap, in this case, remaining water soluble would tend to counteract the anti-foam properties of the anti-foam agent, and, moreover, in some cases, function to increase the foaming properties of the boiler water instead of decreasing them.

Investigation has shown that tannin is a very desirable dispersing agent, because at least when waters having alkaline constituents are treated, and particularly boiler waters, the tannin has better dispersing properties than the clays or soap, while at the same time it does not have the disadvantages of the latter classes of materials.

It may be pointed out that tannin in certain cases and in certain types of waters, has fairly good anti-foam properties and, therefore, the use of tannin in conjunction with a more active anti-foam agent results in a composition having anti-foam properties superior to that of either the materials used separately. Further, the tannin acts as an active dispersing agent for the more active or primary anti-foam material, and this is highly desirable in a good anti-foam composition. Again, the tannin performs the function of conferring upon the resulting composition non-corrosive properties. This is due to the tendency of the tannin extract and similar materials to absorb dissolved oxygen from the boiler feed water or from any other water containing oxygen, which oxygen, if not removed, is one of the principal causes of boiler corrosion. Tannin, of course, is an example of a material which is an active dispersing medium and also acts as a corrosion inhibitor to prevent corrosion of the boiler metal. It is within the province of the present invention in its broad form to use other equivalent materials which perform the same functions as the tannin performs.

The composition may have present a viscosity-increasing agent or bodying material. A number of compounds may be used as the bodying agent, but it is preferable to use corn meal or a material containing starch. The corn-meal or starch acts not only as a bodying material, but also as an additional dispersing agent and increases the dispersion characteristics of the composition. In accordance with one form of the present invention, the anti-foam composition has present a primary dispersion agent, and a secondary dispersion agent, the secondary dispersion agent preferably acting also as a bodying agent or to increase the viscosity of the anti-foam composition, which, of course, contains anti-foam agents, as hereinbefore pointed out.

The increase in the viscosity of the anti-foam composition is desirable since this prevents separation of the active anti-foam constituents from the remainder of the composition.

The following are examples of methods which may be used to obtain the bodying effect.

In one method the meal or starch is heated in the presence of added water or that contained in the liquid tannin extract to a temperature high enough to produce a hydrolysis of the meal. This hydrolyzed meal upon cooling takes on the form of starch paste and acts to increase the viscosity of the anti-foam composition in proportion to the amount of starch or meal used. The amount of bodying agent used in the anti-foam composition may, of course, vary.

In carrying out the present invention, the primary, secondary or tertiary anti-foam agent may be a simple amine saturated or unsaturated, or a mixed amine, saturated or unsaturated. Further, the primary anti-foam agent may be a mixture of simple amines saturated or unsaturated, or a mixture of mixed amines, saturated or unsaturated. The amine compound or the free amine may be formed in situ by decomposition of a suitable salt, said salt upon being added to the water, converting at least a part of the free salt to the free amine.

The compounds which are useful in carrying out the present invention are generally represented by the following formula:

$$\begin{array}{c} R-N-R'' \\ | \\ R' \end{array}$$

In said formula, R denotes an alkyl group; R′ and R″, represent hydrogen, or an alkyl group. This formula is intended to cover the primary, secondary and tertiary amines. When one hydrogen is replaced in $NH_3$ the resulting compound may be designated $RNH_2$, which contains the amino group $NH_2$. When two hydrogen are replaced, the secondary amine is represented by RR′NH, and contains an imino group; and when three hydrogen are replaced, the tertiary amine is formed having the formula: RR′R″N.

Since it is desired that the amines be insoluble in the water treated and do not steam distill to any substantial extent, when boiler water is being treated, it is desirable and in fact practically necessary, that the amines have a high molecular weight of the character herein set forth. The amines having a relatively low molecular weight are soluble in the boiler water, or other water, steam distill to an appreciable extent. It is recognized that the branching of the chain in the chain amines lowers the boiling points of even the high molecular weight amine compounds having at least eleven carbon atoms in the basic R, R′ or R″ group. However, if the boiling point is not greatly reduced, these branch chain compounds may be used in the treatment of boiler water. For the above reasons, in the preferred form of the invention, the compounds coming within the scope of the present invention, should have at least eleven carbon atoms in the basic alkyl group and preferably in each alkyl group of the secondary and tertiary amines.

The following is an illustrative example of how the present invention may be carried out, there being utilized, in addition to the amine anti-foam agent, a dispersing agent and/or a bodying agent. While it may not be necessary in some instances to use a dispersing and/or bodying agent, as a general rule, it is desirable.

The above indicates what is meant by the term "amine having a high molecular weight." By this term it is intended to cover amines of the character set forth having eleven (11) or more carbon atoms. The higher amines of the series $(C_nH_{2n+1})_xNH_y$, where y=0, 1 or 2) which have given very satisfactory results are heptacedyl amine, stearyl amine, secondary stearyl amine and tertiary stearyl amine. Polysubstituted amines and particularly those having eleven (11) or more carbon atoms present in each alkyl group may also be used. The amine, such as heptadecyl amine or stearyl amine may be mixed with a small percentage of corn meal and a predominating quantity of a liquid tannin extract well known in the prior art, and the mixture is heated to a temperature sufficient to produce a hydrolysis of the meal and to gelatinize the final product. Satisfactory results have been obtained by heating the mixture to about 180° F. Higher temperatures may be used. This mixture is fed into the boiler in the form of a water suspension.

As indicated, the preferred form of the anti-foam composition for introduction into the boiler feed water is that of a gelatinized product. Such a gelatinized composition may be made by mixing together an amine, such as heptadecyl amine, stearyl amine, or any other amine or amine mixture herein set forth with corn meal and tannin extract.

The ingredients may be mixed in suitable proportions, of which the following Tables I to IV are illustrative:

Table I (1) Corn meal — 2%, tannin extract — 94%, amine—4%
(2) Corn meal — 4%, tannin extract — 88%, amine—8%
(3) Corn meal — 6%, tannin extract — 78%, amine—16%
(4) Corn meal — 8%, tannin extract — 67%, amine—25%
(5) Corn meal — 8%, tannin extract — 57%, amine—35%

In general, the amine content of the mixture may vary between about 1% to 2% to 35%.

The above percentages are merely illustrative as to the amount of tannin extract and aliphatic amine, and may vary beyond limit of the maximum and minimum above set forth and still come within the spirit of the present invention. As hereinbefore pointed out, the primary anti-foam base, such as the aliphatic amine, may be used by itself, but it is desirable that the primary anti-foam agent be used in conjunction with the tannin, as the tannin assists in the dispersion, and further is in itself an anti-foam agent. It is preferred to form a gelatinized product of the ingredients, but here again, it is within the spirit of the present invention to use the primary anti-foam agent in an anti-foam composition which is not reduced to paste form.

Instead of using corn meal or starch as the viscosity-increasing or bodying agent, various other such agents may be used, as for example, dextrine. When using dextrine, satisfactory results have been obtained when the mixture contained from 5% to 50% of dextrine, which is a degradation product of starch. Instead of using corn meal, starch or dextrine, other bodying agents may be used. Gums, such as gum tragacanth, gum acacia and locust bean gum, which are additional examples of suitable bodying agents, give good results.

The following examples illustrate how the dispersion agents and the bodying agents may be varied:

Table II

| Amine | Tannin extract | Corn meal |
|---|---|---|
| Percent | Percent | Percent |
| 2 | 92 | 6 |
| 5 | 89 | 6 |
| 10 | 84 | 6 |
| 15 | 79 | 6 |
| 20 | 75 | 5 |
| 30 | 66 | 4 |
| 35 | 61 | 4 |

Table III

| Amine | Tannin extract | Bentonite | Corn starch |
|---|---|---|---|
| Percent | Percent | Percent | Percent |
| 2 | 87 | 5.0 | 6.0 |
| 5 | 84 | 5.0 | 6.0 |
| 10 | 79 | 5.0 | 6.0 |
| 15 | 74 | 5.0 | 6.0 |
| 20 | 70 | 5.0 | 6.0 |
| 30 | 61 | 5.0 | 6.0 |
| 35 | 56 | 5.0 | 6.0 |
| 2 | 82 | 10 | 6.0 |
| 5 | 79 | 10 | 6.0 |
| 10 | 74 | 10 | 6.0 |
| 15 | 70 | 10 | 5.0 |
| 20 | 65 | 10 | 5.0 |
| 30 | 56 | 10 | 4.0 |
| 35 | 51 | 10 | 4.0 |

Table IV

| Amine | Tannin extract | British gum |
|---|---|---|
| Percent | Percent | Percent |
| 2 | 86 | 12 |
| 5 | 83 | 12 |
| 10 | 78 | 12 |
| 15 | 73 | 12 |
| 20 | 68 | 12 |
| 30 | 58 | 12 |
| 35 | 53 | 12 |

It is desired to point out that the above examples are merely illustrative of suitable combinations of dispersing agents and bodying agents with the amines, and that various other dispersing agents and bodying agents may be used and still come within the spirit of the present invention.

While usually the amount of bodying agent will vary from 2% to 8%, it may be much higher, as for example, when using dextrine, up to about 50% by weight of the mixture may be dextrine, and again it is not necessary with some of the body agents that the lower limit be 2%. Less than 2% may be used, and while 2% may be considered a satisfactory lower limit for starch, if the starch is used in conjuction with other thickening agents, such as a gum, then the starch may be reduced to less than 2%.

A paste mixture prepared as set forth and containing a primary anti-foam agent, a secondary anti-foaming agent, which preferably has dispersing properties, and a bodying agent of the character herein set forth may be added to boiler water to prevent foaming thereof. More specifically, any of the compositions herein set forth may be added to the boiler water in the ratio of one-quarter pound of the composition per 1000 gallons of water. The amount which may be added is strictly illustrative, and is not to be taken by way of limitation. Obviously, the amount of anti-foam material which is added to the water will depend upon the characteristics of the water. For example, in another experiment it was found that as low as one-twentieth (1/20) of a pound of the anti-foam composition per 1000 gallons of water was satisfactory. In still another case two (2) pounds of the anti-foam composition per 1000 gallons of water positively inhibited the anti-foam tendency of the boiler feed. *In the last named example, where the amine constitutes 35% by weight of the anti-foam material, the concentration of the amine is about 84 parts per million parts of water treated. Larger arounts of the amine than those indicated can also be employed where necessary, although a practical limit of 500 parts per million will be indicated, primarily for reasons of economy.*

The above mixtures and similar mixtures were added to water of the character that the castor oil, previously referred to, was added, and the conditions of the tests were the same.

Tests taken immediately after the introduction of the anti-foam composition showed no foaming occurring. Tests made two and one-half (2½) hours after the introduction of the anti-foam material showed the foaming to be practically nil. Tests which were made after continuous heating of the anti-foam material in the boiler water, under the above conditions, for eight (8) hours, showed a tendency to foam, which was only a small fraction of the foaming occurring before the anti-foam was added. After twenty (20) hours the tendency to foam was not quite as great as that exhibited by the untreated water. Even in the presence of the anti-foam material, there is some tendency to foam, and the amount of foaming in the presence of the anti-foam material, may vary from a very small percentage to 25% to 40% of the foaming that occurs before the anti-foam material is added.

The compounds herein set forth give markedly superior results when treating water containing excess alkalinity. If castor oil, which is a well known anti-foaming agent for water which does not contain excess alkalinity, were used, the oil would become saponified and thereby rendered ineffective and/or harmful. In raw water and water softened in any well known manner, as for example by the lime-soda-ash process, the amines as hereinbefore described are also effective.

The herein referred to amines and amine compounds can each be mixed with the other to form the active anti-foam agent. Moreover, the mixture may contain more than two amines or amine compounds. The primary amines may have an additional primary amine of the character herein set forth, or a plurality of amines mixed therewith to form the amine anti-foam agent. The secondary amines may be mixed with a single amine or a plurality of other secondary amines, and the tertiary amines may be mixed with a single other tertiary amine, or a plurality of tertiary amines to form the active anti-foam agent. Moreover, any of the primary amines herein referred to may be mixed with any of the secondary amines or the anti-foam agent may comprise a mixture of a primary amine compound, a secondary amine compound, and a tertiary amine compound, or a mixture thereof. The tertiary amines may also be mixed with each other to form the active anti-foam compound. It is not thought necessary to refer to all of the mixtures of primary amine compounds and/or secondary amine compounds and/or tertiary amine compounds which may be used in carrying out the present invention. However, as a specific example, it may be stated that secondary stearyl amine and tertiary stearyl amine may be mixed together with the tannic compounds herein referred to and a bodying agent, and excellent results be obtained. The present application is a continuation-in-part of applications Serial Nos. 193,366, 193,367 and 193,368, all filed March 1, 1938, each of said applications being a continuation-in-part of application Serial No. 579, filed January 5, 1935.

While starches, starch degradation products, and gums may be used as bodying agents, broadly any bodying agent may be used which will function to increase the viscosity of the mixture. The bodying agent may be a mixture of organic bodying agents or a mixture of inorganic agents, or the bodying agent may be a mixture of organic and inorganic compounds. As hereinbefore stated, it is preferred that the secondary dispersing agent, such as bentonite, and the like, act as a bodying agent.

The expression "comprising introducing into the bath a composition containing as its essential anti-foam agent an aliphatic amine," or equivalent expressions, as used in some of the claims, is intended to cover the introduction of the amine into the bath or of the bath into the amine.

I claim as my invention:

[1. The process of treating water which includes adding to the water a small amount, not to exceed five hundred parts per million, of a compound chosen from the group consisting of aliphatic primary and secondary amines having at least six carbon atoms in an alkyl group thereof.]

[2. The method of treating water containing solids in the state of suspension to prevent said solids from deleteriously affecting the water, comprising adding to the water an aliphatic amine in an amount not exceeding 500 parts per million, said amine having at least six carbon atoms in an alkyl group thereof.]

3. The method of conditioning an aqueous bath having ingredients present inducing foaming therein comprising introducing into the bath a composition containing as its essential anti-foam agent an aliphatic amine containing at least eleven carbon atoms in an alkyl radical thereof, said amine being characterized by the properties of being insoluble in the bath, and showing little tendency to saponify with the ingredients of the bath, the anti-foam agent being present in an amount sufficient to inhibit foaming of the bath.

4. The method of conditioning an aqueous bath containing excess alkalinity and having ingredients present inducing foaming therein comprising introducing into the bath containing excess alkalinity a composition containing as its essential anti-foam agent an aliphatic amine containing at least eleven carbon atoms in an alkyl radical thereof, said compound being characterized by the properties of being insoluble in the bath and showing little tendency to saponify with the ingredients of the bath, the anti-foam agent being present in an amount sufficient to inhibit foaming of the bath.

5. Boiler water containing alkaline constituents and carrying an aliphatic amine compound foam inhibitor containing at least eleven carbon atoms in an alkyl radical thereof, said inhibitor being present in an amount which inhibits foaming of the boiler water and being characterized by the properties of being substantially insoluble in the boiler water, steam distilling to a negligible extent and showing little tendency to saponify.

6. Boiler water containing alkaline constituents and carrying an aliphatic amine compound foam inhibitor containing at least eleven carbon atoms in an alkyl radical thereof and having the general formula $(C_nH_{2n+1})_xNH_y$, where x is an integer and y is selected from the group consisting of 0, 1 and 2, said inhibitor being characterized by the properties of being substantially insoluble in the boiler water, steam distilling to a negligible extent and showing little tendency to saponify.

7. The method of conditioning an aqueous bath having an alkali constituent comprising introducing into said aqueous bath having an alkali constituent a composition containing as its essential anti-foam agent an aliphatic amine containing at least eleven carbon atoms in an alkyl radical thereof and characterized by the properties of being substantially insoluble in the aqueous bath being treated, steam distilling to a negligible extent, and showing little tendency to saponify with the ingredients of the bath, said amine being present in an amount sufficient to inhibit foaming of the aqueous bath.

8. The method of conditioning boiler water having present ingredients inducing foaming therein, comprising introducing into the boiler water a composition containing as its essential anti-foam agent an aliphatic amine characterized by the properties of being substantially insoluble in the boiler water being treated, steam distilling to a negligible extent and showing little tendency to saponify with the ingredients of the bath, the amine being present in an amount sufficient to inhibit foaming of the bath, said amine compound being represented by the following formula:

$$\begin{array}{c} R-N-R'' \\ | \\ R' \end{array}$$

in which R is an alkyl group containing at least eleven carbon atoms; and R′ and R″ are selected from the group consisting of hydrogen and an alkyl group.

9. The method of conditioning boiler water comprising introducing into said boiler water a composition containing a dispersing agent, and as its essential anti-foam agent an aliphatic amine containing at least eleven carbon atoms in an alkyl radical thereof and characterized by the properties of being substantially insoluble in the boiler water being treated, steam distilling to a negligible extent, and showing little tendency to saponify with the ingredients of the boiler water, said amine being present in an amount sufficient to inhibit foaming of the boiler water.

10. The method of conditioning boiler water comprising introducing into said boiler water a composition containing a tannin dispersing agent, and as its essential anti-foam agent an aliphatic amine containing at least eleven carbon atoms and characterized by the properties of being substantially insoluble in the boiler water being treated, steam distilling to a negligible extent, and showing little tendency to saponify with the ingredients of the boiler water, said amine being present in an amount sufficient to inhibit foaming of the boiler water.

11. The method of conditioning boiler water comprising introducing into said boiler water a composition containing as its essential anti-foam agent an aliphatic amine containing at least eleven carbon atoms, a dispersing agent for said amine and a bodying agent for increasing the viscosity of the composition, said amine being present in an amount sufficient to inhibit foaming of the boiler water and characterized by the properties of being substantially insoluble in the boiler water being treated, steam distilling to a negligible extent, and showing little tendency to saponify with the ingredients of the boiler water.

12. The method of conditioning boiler water comprising introducing into said boiler water a composition containing as its essential anti-foam agent an aliphatic amine containing at least eleven carbon atoms, a tannin dispersing agent for said amine and a bodying agent for increasing the viscosity of the composition, said amine being present in an amount sufficient to inhibit foaming of the boiler water and characterized by the properties of being substantially insoluble in the boiler water being treated, steam distilling to a negligible extent, and showing little tendency to saponify with the ingredients of the boiler water.

13. The method of conditioning boiler water comprising introducing into said boiler water a composition containing as its essential anti-foam agent an aliphatic amine containing at least eleven carbon atoms, a tannin dispersing agent for said amine and a carbohydrate bodying agent for increasing the viscosity of the composition, said amine being present in an amount sufficient to inhibit foaming of the boiler water and characterized by the properties of being substantially insoluble in the boiler water being treated, steam distilling to a negligible extent, and showing little tendency to saponify with the ingredients of the boiler water.

14. The method of conditioning boiler water comprising introducing into said boiler water a composition containing as its essential anti-foam agent an aliphatic amine containing at least eleven carbon atoms, a dispersing agent for said amine and a carbohydrate bodying agent for increasing the viscosity of the composition, said amine being present in an amount sufficient to inhibit foaming of the boiler water and characterized by the properties of being substantially insoluble in the boiler water being treated, steam distilling to a negligible extent, and showing little tendency to saponify with the ingredients of the boiler water.

15. The method of conditioning boiler water which has been softened by the lime-soda process comprising introducing into said water which has been softened by the lime soda process a composition containing as its essential anti-foam agent an aliphatic amine containing at least eleven carbon atoms in an alkyl radical thereof and characterized by the properties of being substantially insoluble in the boiler water being treated, steam distilling to a negligible extent, and showing little tendency to saponify with the ingredients of the boiler water, said amine being present in an amount sufficient to inhibit foaming of the boiler water.

16. The method of conditioning boiler water which has been softened by treatment with a zeolite comprising introducing into said water which has been softened by treatment with zeolite, a composition containing as its essential anti-foam agent an aliphatic amine containing at least eleven carbon atoms in an alkyl radical thereof and characterized by the properties of being substantially insoluble in the boiler water being treated, steam distilling to a negligible extent, and showing little tendency to saponify with the ingredients of the boiler water, said amine being present in an amount sufficient to inhibit foaming of the boiler water.

17. An anti-foam composition for treating boiler water to inhibit foaming therein, said composition comprising as its essential anti-foam agent an aliphatic amine compound containing at least eleven carbon atoms, a tannin as a dispersing agent, and a bodying agent which increases the viscosity of the composition and which inhibits the separation of the anti-foam constituents from the composition, said amine compound being characterized by the properties of being substantially insoluble in the boiler water being treated, steam distilling to a negligible extent, and showing little tendency to saponify with the ingredients of the boiler water, said amine compound being present in an amount which does inhibit foaming.

18. An anti-foam composition for treating boiler water to inhibit foaming therein, said composition comprising as its essential anti-foam agent an aliphatic amine compound containing at least eleven carbon atoms, a tannin as a dispersing agent, and a carbohydrate bodying agent to increase the viscosity of the composition, said amine compound being characterized by the properties of being substantially insoluble in the boiler water being treated, steam distilling to a negligible extent, and showing little tendency to saponify with the ingredients of the boiler water.

19. The method of conditioning an aqueous bath having present ingredients inducing foaming therein, comprising introducing into the bath a composition containing as its essential anti-foam agent a mixture of primary, secondary and tertiary aliphatic amines, each of said amines containing at least eleven carbon atoms in an alkyl radical thereof, said mixture of amines being characterized by the properties of being insoluble in the bath, and showing little tendency to saponify with the ingredients of the bath, the anti-foam agent being present in an amount which does inhibit foaming of the bath.

20. The method of conditioning boiler water having present alkaline ingredients inducing foaming therein, comprising introducing into the boiler water a composition containing as its essential anti-foam agent a mixture of primary, secondary, and tertiary aliphatic amines, each of said amines containing at least eleven carbon atoms in an alkyl radical thereof, said mixture of amines being characterized by the properties of being insoluble in the boiler water, and showing little tendency to saponify with the ingredients of the boiler water, the anti-foam agent being present in an amount which does inhibit foaming of the boiler water.

21. The method of conditioning an aqueous bath having present ingredients inducing foaming therein, comprising introducing into the bath a composition containing as its essential anti-foam agent a mixture of secondary and tertiary aliphatic amines, each of said amines containing at least eleven carbon atoms in an alkyl radical thereof, said mixture of amines being characterized by the properties of being insoluble in the bath, and showing little tendency to saponify with the ingredients of the bath, the anti-foam agent being present in an amount which does inhibit foaming of the bath.

22. The method of conditioning boiler water having present alkaline ingredients inducing foaming therein, comprising introducing into the boiler water a composition containing as its essential anti-foam agent a mixture of secondary and tertiary aliphatic amines, each of said amines containing at least eleven carbon atoms in an alkyl radical thereof, said mixture of amines being characterized by the properties of being insoluble in the boiler water, and showing little tendency to saponify with the ingredients of the boiler water, the anti-foam agent being present in an amount which does inhibit foaming of the boiler water.

23. The method of conditioning an aqueous bath having present ingredients inducing foaming therein, comprising introducing into the bath a composition containing as its essential anti-foam agent an aliphatic amine characterized by the properties of being substantially insoluble in the aqueous bath being treated, steam distilling to a negligible extent and showing little tendency to saponify with the ingredients of the bath, the amine compound being present in an amount sufficient to inhibit foaming of the bath, said amine compound being represented by the following formula:

$$\begin{array}{c} R-N-R'' \\ | \\ R' \end{array}$$

in which R is an alkyl group containing at least eleven carbon atoms; and R′ and R″ are selected from the group consisting of hydrogen and an alkyl group.

24. The method of conditioning an aqueous bath having ingredients present inducing foaming therein comprising introducing into the bath stearyl amine.

25. The method of conditioning an aqueous bath having ingredients present inducing foaming therein comprising introducing into the bath a mixture of stearyl amine, tannin, and a carbohydrate which increases the viscosity of the mixture, said stearyl amine being present in an amount sufficient to inhibit foaming of the bath.

26. The method of conditioning boiler water having present ingredients inducing foaming comprising introducing into the boiler water a heptadecyl amine.

27. Boiler water containing alkaline constituents and carrying as an inhibitor of foaming heptadecyl amine.

*28. The process of treating water which includes adding to the water in an amount not in excess of 500 parts per million, a compound selected from the group consisting of aliphatic primary and secondary amines and salts of such amines readily hydrolyzable into the free amines, said amines having at least eleven carbon atoms in an alkyl radical thereof per molecule.*

*29. The method of treating water containing solids in the state of suspension to prevent said solids from deleteriously affecting the water, comprising adding to the water an aliphatic amine in an amount not exceeding 500 parts per million, said amine having a total of at least eleven carbon atoms in an alkyl radical thereof per molecule.*

*30. The method of treating boiler water having a tendency to foam on boiling which comprises dispersing into said water in an amount not in excess of 500 parts per million, an amine selected from the group consisting of aliphatic primary amines, aliphatic secondary amines, and*

*mixtures of said primary amines and secondary amines, said amine containing at least eleven carbon atoms in an alkyl radical thereof per molecule, and boiling the resulting dispersion.*

*31. A method as claimed in claim 28 wherein the alkyl radical is an octadecyl radical.*

WAYNE L. DENMAN.

REFERENCES CITED

The following references are of record in the file of this patent or the original patent:

UNITED STATES PATENTS

| Number | Name | Date |
|---|---|---|
| 1,981,634 | Richardson | Nov. 20, 1934 |
| 1,981,635 | Clarkson | Nov. 20, 1934 |
| 2,074,380 | Flett | Mar. 23, 1937 |

FOREIGN PATENTS

| Number | Country | Date |
|---|---|---|
| 782,930 | France | Mar. 25, 1935 |

OTHER REFERENCES

Sharples Synthetic Organic Chemicals, 1937, 10th ed., page 28.